United States Patent
Xiang

[11] Patent Number: 5,959,431
[45] Date of Patent: Sep. 28, 1999

[54] METHOD AND APPARATUS FOR INSTABILITY COMPENSATION OF V/HZ PULSE WIDTH MODULATION INVERTER-FED INDUCTION MOTOR DRIVES

[75] Inventor: Youqing Xiang, Fort Smith, Ark.

[73] Assignee: Baldor Electric Company, Ft. Smith, Ark.

[21] Appl. No.: 08/943,603

[22] Filed: Oct. 3, 1997

[51] Int. Cl.[6] ....................................... H02P 5/28
[52] U.S. Cl. ............................................. 318/811
[58] Field of Search ................... 363/34, 35, 37, 363/41, 95, 96, 97, 98; 318/800, 801, 811

[56] References Cited

U.S. PATENT DOCUMENTS 5,585,708  12/1996  Richardson et al. ................. 318/800

OTHER PUBLICATIONS

Kunio Koga, Stability Analysis and Stabilizing Control of Inverter–Fed Induction Motor Electrical Engineering in Japan, vol. 109, No. 3 Scripta Technica, Inc. (1990).

Ryuzo Ueda, Experimental Results and Their Simplified Analysis on Instability Problems in PWM Inverter Induction Motor Drives, The Institute of Electrical and Electronics Engineers Transactions on Industry Applications, vol. 25, No. 1 (1989).

Morris Lockwood, Simulation of Unstable Oscillations in PWM Variable–Speed Drives, IEEE Transactions on Industry Applications, vol. 24, No. 1 (Jan./Feb. 1988).

Ryuzo Ueda, Stability Analysis in Induction Motor Driven by V/f Controlled General—Purpose Inverter, IEEE Transactions on Industry Applications, vol. 28, No. 2 (Mar./Apr. 1992).

Nobuyoshi Mutoh, Stabilizing Control Method for Suppressing Oscillations of Induction Motors Driven by PWM Inverters, IEEE Transactions on Industrial Electronics, vol. 37, No. 1 (Feb. 1990).

Marek Budzisz, Stabilization Procedures Based on Fuzzy Inference Algorithms for PWM Drives, The Institue of Electrical and Electronics Engineers, Inc. (1995).

Paul C. Krause, Ánalysis of Electric Machinery, The Institute of Electrical and Electronics Engineers, Inc., New York.

Peter Vas, *Electrical Machines and Drives*, Clarendon Press Oxford (1992).

*Primary Examiner*—William M. Shoop, Jr.
*Assistant Examiner*—Rina I. Duda
*Attorney, Agent, or Firm*—Arnold, White & Durkee

[57] ABSTRACT

Index signals which represent the degree of instability in a three-phase induction motor system is derived by using phase current signals which are usually already available in V/Hz PWM inverters for other purposes. Proportional integration compensators, which may be implemented in software, process these index signals and generate frequency and/or voltage adjustments to the V/Hz controller in order to compensate for speed instability in the system. The compensation algorithm is robust to system changes and is also effective to improve acceleration and deceleration performance.

18 Claims, 10 Drawing Sheets

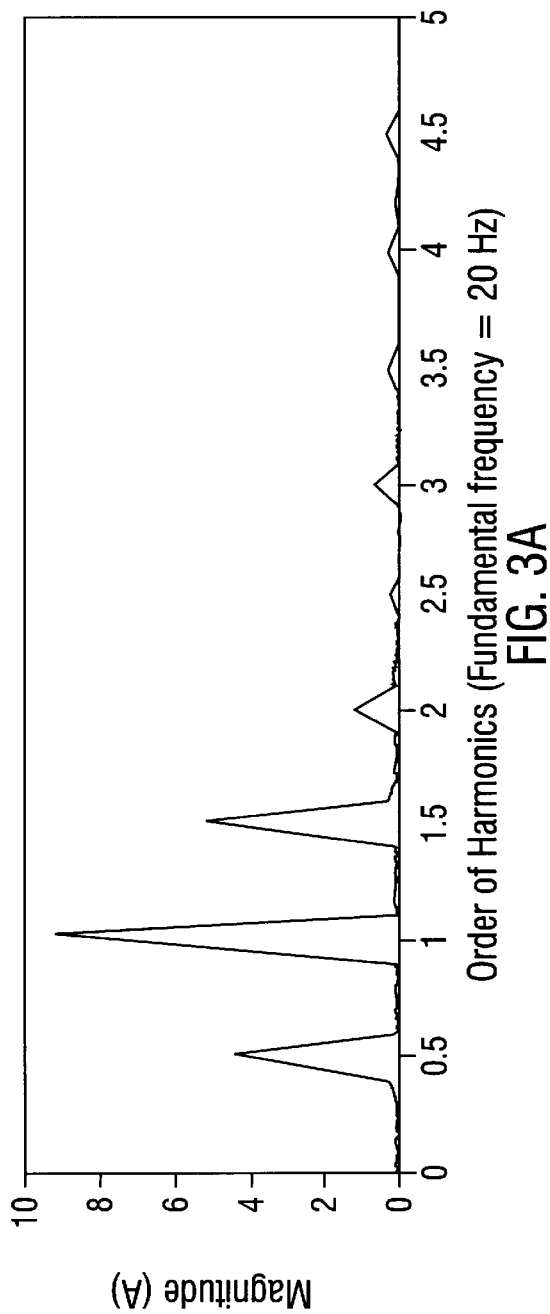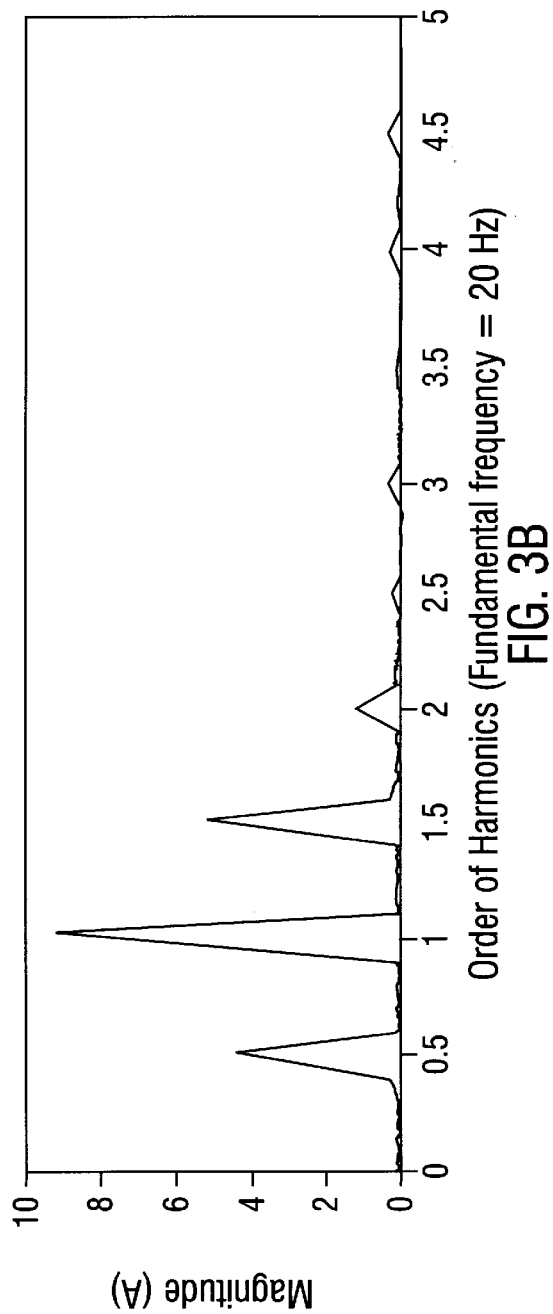

METHOD AND APPARATUS FOR INSTABILITY COMPENSATION OF V/HZ PULSE WIDTH MODULATION INVERTER-FED INDUCTION MOTOR DRIVES

FIELD OF THE INVENTION

This invention relates generally to the field of induction motor drives, and more particularly to pulse width modulation inverters for induction motor drive systems.

BACKGROUND OF THE INVENTION

Using fast switching power semiconductor devices, such as insulated gate bipolar transistors (IGBTs), a pulse width modulation (PWM) inverter can be operated at high frequency (up to 20 kHz), significantly improving induction motor performance. Advantages include lower electromagnetic noise, higher efficiency, and more output torque. Compared with speed feedback-based current-regulated field orientation control, open loop voltage/frequency ("V/Hz") control has the advantages of simplicity and cost effectiveness. Therefore V/Hz PWM inverter controls are widely used in adjustable speed applications, such as fans, pumps, blowers, cranes, hoists, and so on. As more and more applications for V/Hz inverter controls are discovered, more and more features are identified as being desirable, such as higher horsepower rating, quieter operation, higher efficiency, wider adjustable speed range, and wider load variation range.

Under certain operation conditions, some problems with known voltage inverters have been perceived. One among these is an instability phenomena relating to the obvious and sustained speed oscillation of motors which can occur when they are driven by V/Hz PWM inverters.

Open loop V/Hz induction motor drives most often suffer instability problems under light load and at low frequency. These problems can become even worse for large horsepower drives, high efficiency motors, and high PWM frequency operation, thus limiting the applications of such drives. The inventor and others have conducted extensive experimental investigation to characterize such instability phenomena.

Instability problems with V/Hz inverters have been observed and analyzed by researchers. See, e.g.: Kunio Koga, "Stability Analysis and Stabilizing Control of Inverter-Fed Induction Motor," *Electrical Engineering in Japan*, Vol. 109, No. 3, pp. 130–140, 1989 ("Koga"); Ryuzo Ueda, Toshikatsu Sonoda and Shigeo Takata, "Experimental Results and Their Simplified Analysis on Instability Problems in PWM Inverter Induction Motor Drives," *IEEE Trans. On Industry Applications*, Vol. 25, No. 1, Jan./Feb. 1989, pp. 86–95 ("Ueda I"); Morris Lockwood, "Simulation of Unstable Oscillations in PWM Variable-Speed Drives," *IEEE Trans. On Industry Applications*, Vol. 24, No. 1, Jan./Feb. 1989, pp. 137–141 ("Lockwood"); Ryuzo Ueda, et al., "Stability Analysis in Induction Motor Driven by V/f Controlled General Purpose Inverter," *IEEE Trans. On Industry Applications*, Vol. 28, No. 2, Mar./Apr., 1992, pp. 472–481 ("Ueda II").

Stability analysis of induction motors fed by pure sinusoidal voltage may be performed by using small signal linearization around the operating point. See, e.g., P. C. Krause, O. Wasynczuk and A. D. Sudhoff, "Analysis of Electric Machinery," *IEEE PRESS*, 1994. For V/Hz PWM inverter driven induction motors, the instability analysis becomes more complicated. An idealized induction motor (IIM) has been proposed to analyze the effects of motor parameters, dead time and dc link capacitor. See, e.g., Koga. Later, these effects have also been analyzed based on a practical induction motor model. See, e.g., Ueda II. Experimental investigations of the instability problem have been conducted (see, e.g., Ueda I) in which an index was proposed to measure the "degree of instability." System dynamic simulations have been conducted to investigate these unstable oscillations. See., e.g., Lockwood. These investigations and analyses have revealed some important facts about this problem. Some relevant points may be summarized as follows:

(a) The oscillation states depend on motor design, such as motor parameters (resistance, inductance); the number of poles; motor geometry; loss of core material; and the moment of rotor inertia.

(b) The oscillation states also depend on PWM inverter parameters such as the dead time; dc link capacitor; PWM frequency and strategy.

(c) The oscillation states further depend on operating conditions such as output frequency; shaft load, applied voltage and even the transition path to the operating point.

Those of ordinary skill in the art will generally understand that motor oscillations can result from uncontrolled energy exchanges among DC link capacitors, motor magnetic fields, and rotor inertia. Any mechanism to damp this energy exchange would be expected to stabilize the oscillation.

On the other hand, it can be difficult to derive an effective stabilization control method, since many variables are involved in the phenomena. Koga has proposed a voltage vector feedback method to remove the effects of leakage inductance and primary resistance by using the phase current feedback. In Nobuyoshi Mutoh, et al., "Stabilizing Control Method for Suppressing Oscillations of Induction Motors Driven by PWM Inverter," *IEEE Trans. On Industrial Electronics*, Vol. 37, No. 1, Feb. 1990, pp. 48–56 ("Mutoh"), there is proposed a stabilizing control method involving measuring the interval of negative and positive inverter input currents. This requires a very precise circuit specially designed for high PWM frequency. Recently, fuzzy inference algorithms have been theoretically investigated for oscillation stabilization. See, e.g., Marek Budzisz, and Zbigniew Nowacki, "Stabilization Procedures Based on Fuzzy Inference Algorithms for PWM Drives," *Conference Record of 1995 IAS Meeting*, pp. 1663–1667 ("Budzisz").

An instability compensation method should preferably be effective, simple and robust. The investigated methods mentioned above are believed to have potential drawbacks, and the present invention is believed to offer advantages over prior art methods and apparatuses.

SUMMARY OF THE INVENTION

Experimental investigation has been performed to characterize motor instability phenomena. From these results, index signals which represent the degree of oscillation have been derived based on phase current signals which are usually already available in the V/Hz PWM inverter for other purposes. By processing these index signals, two decoupled proportional integration controllers, which may be implemented either in hardware or in software, are provided to generate command frequency and/or voltage adjustment to a V/Hz controller.

In accordance with one aspect of the present invention, a compensation algorithm and apparatus can be implemented in software and inserted into existing control code without any hardware modification. Therefore, the disclosed method and apparatus is very simple and readily implemented.

In accordance with another aspect of the invention, the control algorithm is robust with respect to system changes. Also, the algorithm can improve the acceleration and deceleration performance of drives.

BRIEF DESCRIPTION OF THE DRAWINGS

Various features and aspects of the present invention will perhaps be best understood with reference to a detailed description of a specific embodiment of the invention, when read in conjunction with the accompanying drawings, wherein:

FIG. 3 is a graph showing the Fourier transform of the waveforms of FIG. 2;

DETAILED DESCRIPTION OF A SPECIFIC EMBODIMENT OF THE INVENTION

Figure 1:
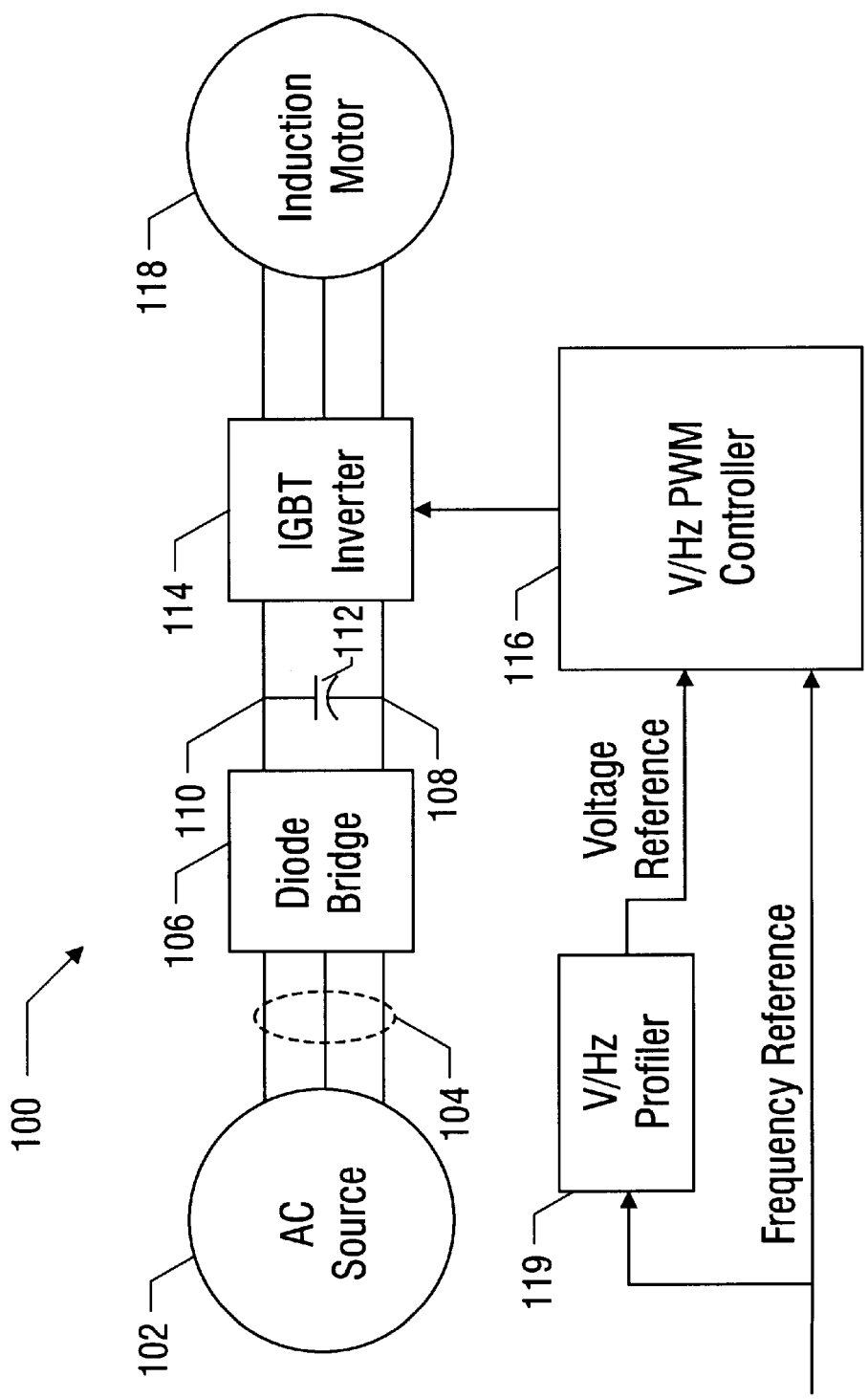
FIG. 1 is a block diagram of a prior art PWM induction motor system.

A block diagram of a prior art open-loop V/Hz PWM inverter-fed induction motor drive system 100 with which one embodiment of the invention might be used is shown in FIG. 1. In FIG. 1, system 100 is a 10 HP, 460 V system where the inverter employs a third harmonic injected sinusoidal PWM scheme of adjustable carrier frequency from 2.5 kHz to 15.0 kHz and with 3 $\mu$Sec "dead time." (It is to be understood, of course, the present invention is in no way limited to systems having these particular specifications, and those of ordinary skill in the art having the benefit of the present disclosure will appreciate how the present invention may be practiced in a wide variety of contexts and applications.)

As shown in FIG. 1, system 100 includes a source of three-phase AC power 102, providing a three-phase AC power signal on three power supply lines 104. In a customary and conventional arrangement, the AC power signal is applied to diode bridge 106 for rectification into a DC signal presented on DC bus lines 108 and 110. A capacitor 112 is disposed between bus lines 108 and 110.

The DC signal on lines 108 and 110 is next applied to a power inverter 114, which, in the presently disclosed embodiment of the invention is an insulated-gate bipolar transistor (IGBT) inverter. As will be familiar and appreciated by those of ordinary skill in the art, inverter 114 functions under control of a voltage/frequency (V/Hz) pulse width modulation (PWM) controller 116 to convert the DC signal on lines 108 and 110 into a three-phase pulse-width modulation signal to be applied to the windings of a three-phase induction motor 118.

As shown in FIG. 1, V/Hz PWM controller 116 receives voltage and frequency reference signals which specify the desired voltage and frequency of the PWM waveform to be generated. In one embodiment, an externally-applied frequency reference signal is applied to V/Hz controller 116, as well as to a V/Hz profiler circuit 119. V/Hz profiler 119 establishes a relationship between the frequency reference and the voltage reference.

Pulse-width modulated motor control circuits are common and well-understood. The details of the design and operation of such power control electronics in controller 116 and inverter 114 are not considered relevant for the purposes of the present disclosure, and hence will not be discussed in depth herein.

As will be hereinafter described in further detail, the present invention may be advantageously employed in connection with the system of FIG. 1, such that the motor currents are used as an indicator of instability based on their frequency spectrum.

Systems such as system 100 in FIG. 1 have been found to exhibit instability problems at particular frequencies. For the system 100 having the specifications discussed above, experimental data suggests that instability is likely to be most severe at an output frequency of approximately 20 Hz.

Figure 2A:
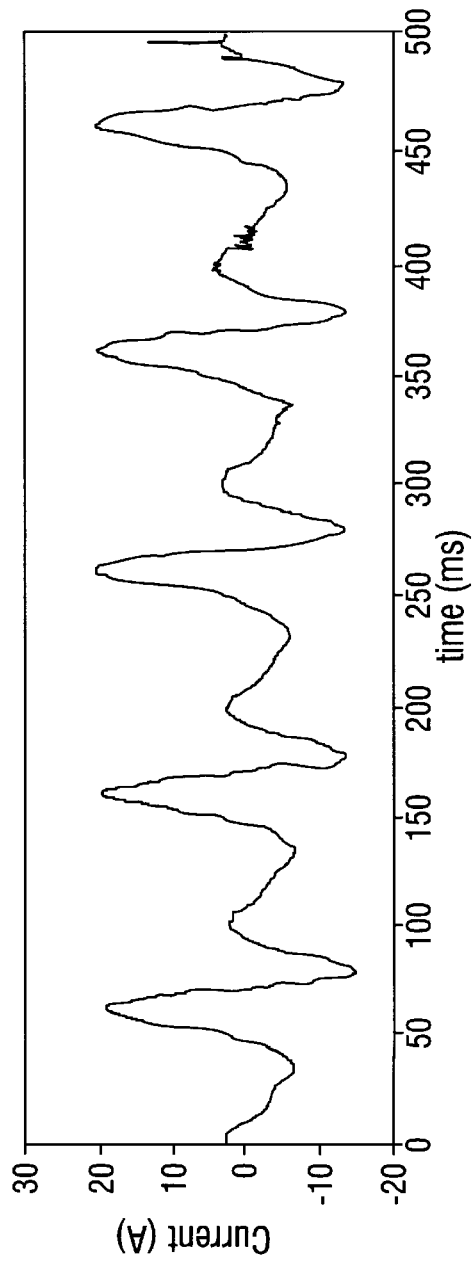
FIG. 2 is a graph showing the waveform of two phase currents in the system of FIG. 1.
Figure 2B:
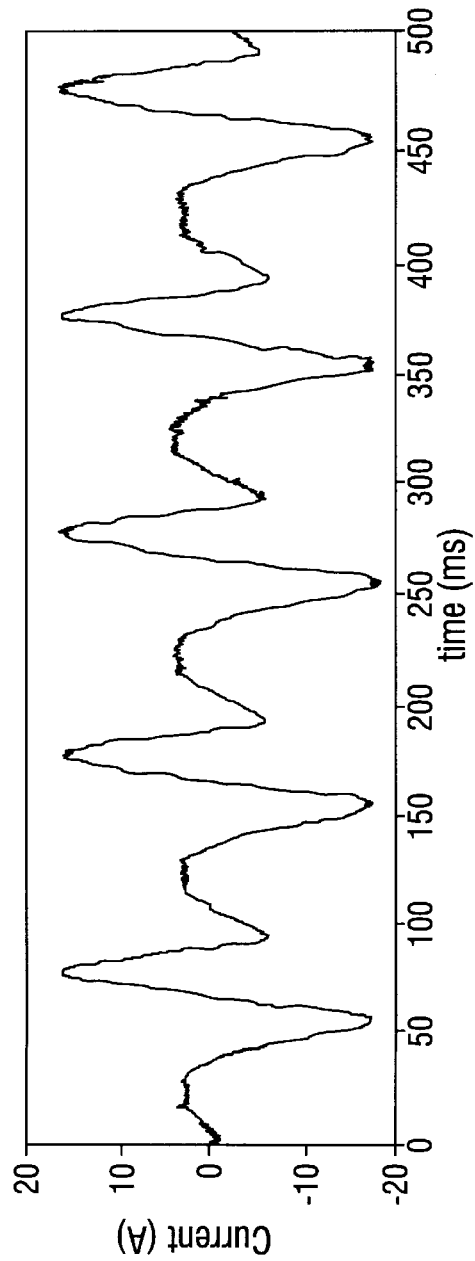

Current waveforms of two phases of motor 118 are shown in FIG. 2, and their corresponding fast Fourier transform (FFT) results, showing the frequency spectra for the two phases, are given in FIG. 3. From FIG. 3 it can be seen that the two currents have almost the same frequency content, and further that the major harmonics appear to be a side band of the fundamental frequency. Also, there exist very strong half-order sub harmonics, which can be expected to be a major contributor to undesirable speed oscillation.

Figure 4:
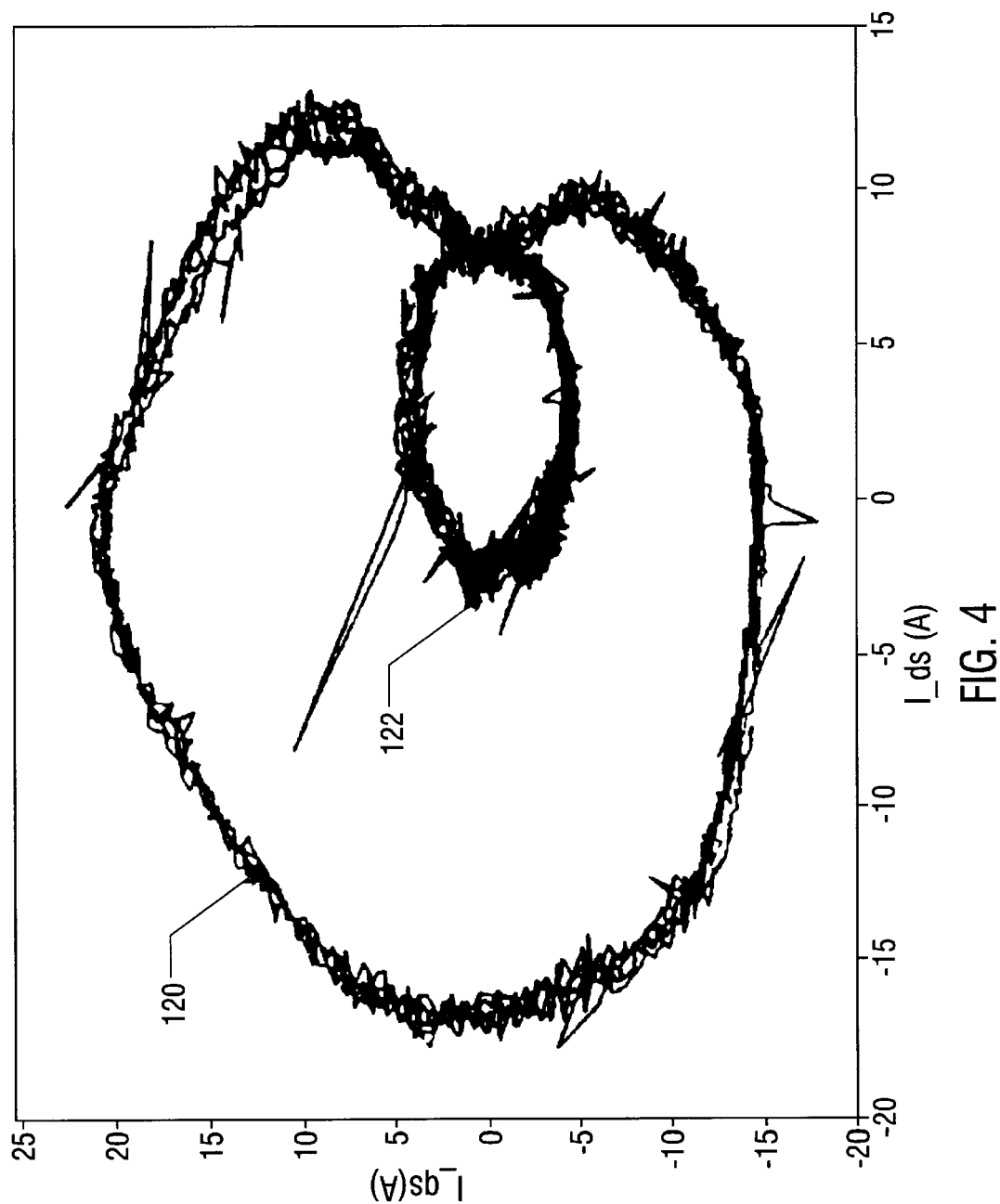
FIG. 4 is a graph showing the stator vector current in the system of FIG. 1.

The stator current vector locus is shown in FIG. 4. The trace in FIG. 4 represents the stator current vector of motor 118 under sustained oscillation. In FIG. 4, two major loops are evident, designated generally with reference numerals 120 and 122. By varying either the output frequency or the output voltage from this worst point (i.e., 20 Hz), instability can be gradually be reduced, as summarized in the following Table 1.

TABLE 1

INSTABILITY VS. OUTPUT FREQUENCY AND VOLTAGE

| OUTPUT FREQU-ENCY (Hz) | OUTPUT VOLTAGE (V) | FUNDA-MENTAL CURRENT (A) | MAJOR CURRENT HARMONIC FREQUENCY AND MAGNITUDE | | | |
|---|---|---|---|---|---|---|
| | | | F_h1 (Hz) | F_h2 (Hz) | F_h3 (Hz) | F_h4 (Hz) |
| 20 | 339.0 | 9.40 | 1.10 | 0.84 | 40.6 | 0.92 |
| 20 | 269.5 | 3.88 | 11.2 | 1.12 | 28.9 | 1.12 |
| 20 | 315.5 | 6.36 | 10.0 | 3.39 | 30.0 | 3.82 |
| 18 | 315.5 | 8.40 | 1.10 | 0.68 | 36.6 | 0.92 |
| 22.5 | 315.5 | 5.00 | 10.7 | 0.82 | 34.3 | 0.88 |

During this variation, the number of major loops in the stator current vector (FIG. 4) increases, each of the loops moving gradually closer until the loops converge to appear as a single circle when stable operation is achieved.

Figure 5:
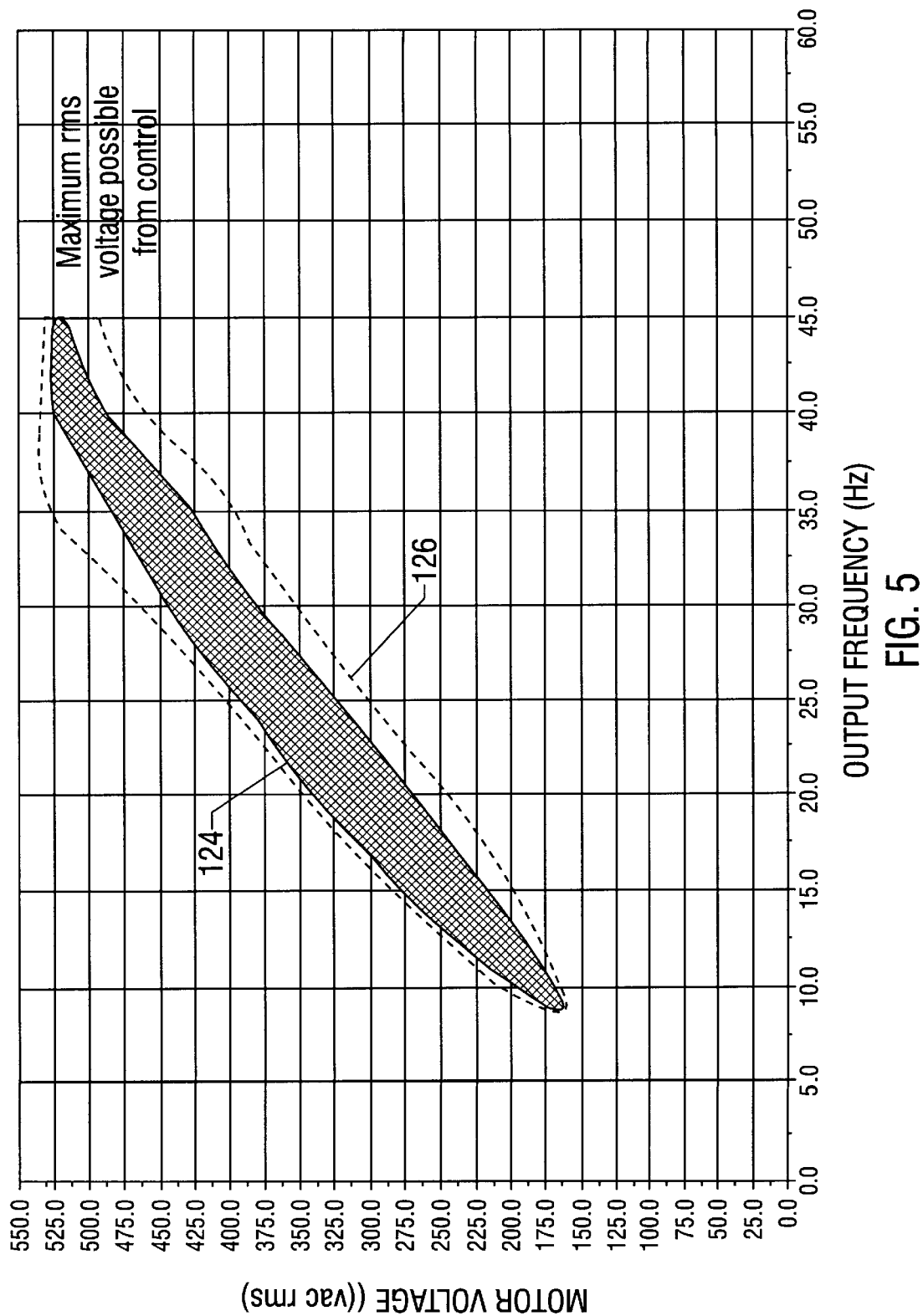
FIG. 5 is a graph showing the instability region of the system of FIG. 1.

FIG. 5 illustrates the instability region of system 100 from FIG. 1. In the graph of FIG. 5, motor voltage is plotted along the vertical axis and output frequency is plotted along the horizontal axis. The instability region of the system at a 2.5 kHz PWM frequency is represented by the shaded area designated with reference numeral 124. As the PWM frequency is increased, the instability region increases. The instability region for the system at a 5.0 kHz PWM frequency is indicated by the dashed line designated generally with reference numeral 126 in FIG. 5.

From the foregoing, some observations may be made: First, harmonic content is believed to be a good indicator of the instability phenomenon. Since there is no obvious and deterministic relationship between these harmonics and the fundamental frequency, an open loop harmonic cancellation control seems unfeasible to design. Therefore, the present invention involves a feedback control method to compensate for current harmonics associated with motor instability.

Second, given the instability region 124 as shown in FIG. 5, one approach to addressing problems with instability could be to adjust the output voltage out of the instability region. However, by doing so, the motor will not operate at the optimal design flux level. Further, this approach would not be expected to be as effective on high horsepower drives as on small drives, since high horsepower drives tend to exhibit a wider instability region. Thus, in accordance with one aspect of the invention, automatic compensation is achieved through a mechanism for identifying the instability.

Identification of Instability

The purpose of instability identification in accordance with the presently disclosed embodiment is to provide real-time signals representing degrees of instability. These signals are advantageously provided to an instability compensator. In order to simplify the open loop V/Hz PWM control, the use of a speed feedback signal from the shaft-mounted speed sensor should preferably be avoided.

As those of ordinary skill in the art will be aware, in smaller controls a DC bus current signal is commonly used for current protection, slip compensation, status display, and the like. In larger V/Hz PWM controls, phase current sensing is usually employed for these purposes, since the distributed DC bus structure makes bus current sensing difficult. Also, it has been proposed to use phase current sensing on smaller controls, since the bus current is a much noisier and less informative signal. Therefore, phase currents are preferably exploited to identify instabilities.

Using the concepts of space vectors (see, e.g., Peter Vas, *Electric Machines and Drives—A Space Vector Theory Approach*, Oxford Science Publications, 1992), the stator voltage balance equation of an induction motor can be expressed as:

$$\overline{v_S} = R_S \overline{i_S} + L_S \frac{d\overline{i_S}}{dt} + \overline{e_m} \qquad (1)$$

Where $\overline{v_s}$, $\overline{i_s}$, and $\overline{e_m}$ are the stator voltage vector, the stator current vector, and back emf vector, respectively, and where Ls is the leakage inductance of the winding of motor 118. The stator current vector $\overline{i_s}$ is calculated as:

$$\overline{i_S} = i_\alpha + \sqrt{-1}\, i_\beta \qquad (2)$$

where $$i_\alpha = -i_b - i_c \qquad (3)$$

and $$i_\beta = (i_b - i_c)/\sqrt{3} \qquad (4)$$

Under stable steady state operation, all vectors (voltage, current, and back emt) have fixed magnitude and rotate at a constant speed. Under unstable operation, the current vector has an oscillation in both magnitude and rotation speed, as discussed above. Therefore, the back emf vector can be expected also to oscillate in both magnitude and rotation speed, since the voltage vector is tightly controlled by the V/Hz PWM controller to have fixed magnitude and rotation speed.

Considering that the back emf vector is associated with the rotor speed and air-gap flux, it has relatively slower dynamics than the current vector. Therefore, the back emf vector can be assumed to be a constant during a relatively short sampling period. Hence, Equation 1 above suggests a first order dynamic system with voltage vector as input, current vector as output and back emf as disturbance.

The oscillation of the current vector can be characterized by its magnitude change $$\Delta |\overline{i_S}|$$

and its angular speed change $\Delta\omega$, which can be mathematically expressed as follows:

$$\Delta |\overline{i_S}| = |\overline{i_S}(k)| - |\overline{i_S}(k-1)| \qquad (5)$$

where $$|\overline{i_S}(k)| = \sqrt{i_\alpha^2(k) + i_\beta^2(k)} \qquad (6)$$

and $$\Delta\omega = \Delta\theta(k) - \Delta\theta(k-1) \qquad (7)$$

where $$\Delta\theta(k) = \frac{i_\alpha(k)i_\beta(k-1) - i_\alpha(k-1)i_\beta(k)}{2|\overline{i_S}(k)||\overline{i_S}(k-1)|} \qquad (8)$$

If the motor is running stably, both $$\Delta |\overline{i_S}|$$

and $\Delta\omega$ should be zero. Thus, these two variables can be used to identify any instability. (In one embodiment, the division operation in the calculation of $\Delta\theta$ (k) can be discarded to save some execution time.)

Design of Compensation Controller

An instability compensation controller in accordance with the presently disclosed embodiment of the invention should preferably take the above instability identifying signals $$\Delta |\overline{i_S}|$$

and $\Delta\omega$ as its inputs. From the motor dynamics described by Equation 1 above, the output of the compensation controller preferably should be the voltage vector $\Delta\overline{v_s}$, which is a two dimensional variable that can be decomposed to two scalar components, such as $\Delta(v_\alpha, v_\beta)$ in rectangular coordinates, $\Delta(|\overline{v_S}|, \angle\overline{v_S})$ in polar coordinates, or $\Delta(v_a, v_b, v_c = -v_a - v_b)$ in motor phase coordinates.

Figure 6:
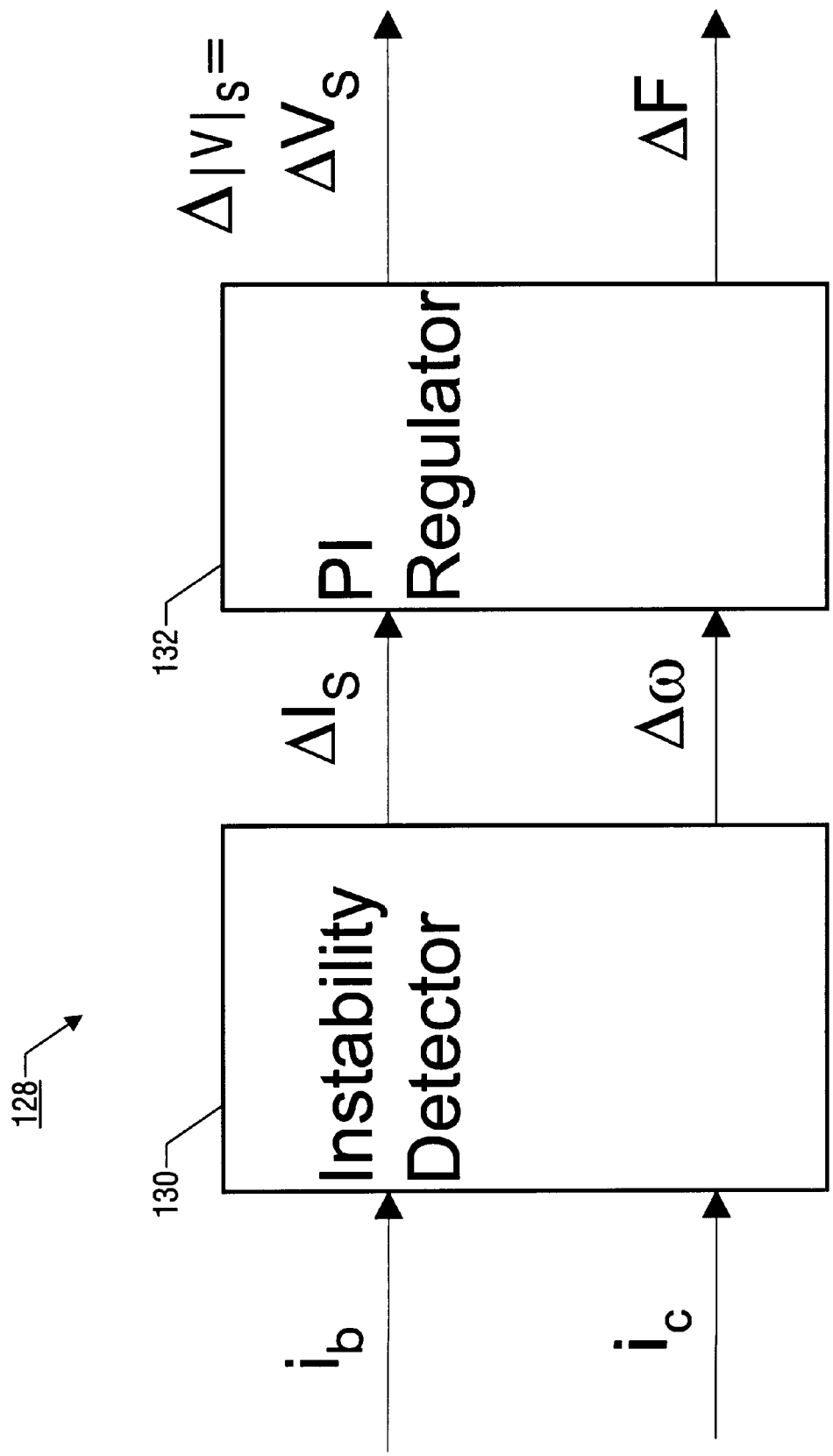
FIG. 6 is a block diagram of the instability compensation controller in accordance with one embodiment of the invention.

FIG. 6 is a simplified block diagram of an instability compensator 128 in accordance with the presently disclosed embodiment of the invention. As shown in FIG. 6, instability compensator 128 comprises an instability detector 130 and a proportional integration regulators 132. In accordance with one aspect of the presently disclosed embodiment of the invention, instability detector 130 functions to compute the values $\Delta|\overline{i_S}|$ and $\Delta\omega$ (see Equations 5, 6, 7 and 8 above). These values are the provided to proportional integration regulators 132, which use these values to derive the incremental voltage vector $\Delta\overline{v_s}$, as will be hereinafter described in further detail.

To be compatible with a V/Hz PWM control 116 as shown in FIG. 1, the polar decomposition of $\Delta\overline{v_s}$ may be employed. Considering that the compensation controller is a kind of perturbation control superimposed onto the standard V/Hz PWM controller, its output needs to reflect the changes of voltage magnitude and frequency. Therefore, proportional integration regulators 132 have a combined structure of two inputs and two outputs; as shown in FIG. 6, the inputs to regulators 132 are $\Delta|\overline{i_S}|$ and $\Delta\omega$, while the outputs are $\Delta|\overline{v_S}|$ and $\Delta F$.

A simple decoupled controller can be used to implement this proportional integration compensation algorithm according to the following equations:

$$\Delta|\overline{v_S}| = K_{pv} * \Delta|\overline{i_S}| + K_{iv} * \int \Delta|\overline{i_S}| dt \qquad (9)$$

$$\Delta(\angle\overline{v_S}) = K_{pf} * \Delta\omega + K_{if} * \int \Delta\omega dt \qquad (10)$$

Where $K_{pv}$, $K_{iv}$, $K_{pf}$, and $K_{if}$ are predetermined proportional integration coefficients which determine the characteristics of proportional integration regulators 132 and hence determine compensation performance. It is believed that those of ordinary skill in the art having the benefit of the present disclosure will be readily able to select appropriate proportional integration coefficients depending upon various implementation-specific variables, such as desired compensation adjustment limits, compensation response, and so forth.

The incremental voltage angle is linearly related to the incremental frequency by the sampling period. That is, having computed $\Delta|\overline{v_S}|,$ $\Delta F$ can be computed by dividing $\Delta(\angle\overline{v_s})$ by the sampling period.

As will be hereinafter described with reference to FIG. 7, the outputs of regulators 132 are respectively added to the voltage command and frequency reference signals of a V/Hz controller 116 to provide the instability compensation capability. Those of ordinary skill in the art will appreciate that these proportional integration regulators 132 may be readily implemented either in hardware or in software in a given implementation of the invention. When implemented in software, the proportional integration code can be inserted to the existing code without timing and task scheduling changes. Even a single frequency adjustment can be effective for instability compensation.

Experimental investigations have shown that instability happens at lower output frequencies than the base frequency. The major oscillation is attributed to sub-harmonics, and the compensated frequency is usually low (4 Hz to 20 Hz). Therefore, the sampling frequency for the phase current sensing is not critical, and about 1 kHz is enough. But since the differential is used, two phase currents have to be sampled simultaneously. Otherwise, software compensation may be used to correct the error from the sequential sampling.

To comply with signal noises, low pass filters at the input interim and output may be inserted in the digital signal processing. Also, limits on the voltage and frequency adjustments may be made to take care of extreme cases. In one embodiment, a 5 to 10% voltage limit and 0.5 Hz to 2.5 Hz frequency limit are imposed. The time constant of the PI controller in the present embodiment is 4 mSec, and the gains are determined based on the current sensing scales and output limits.

Figure 7:
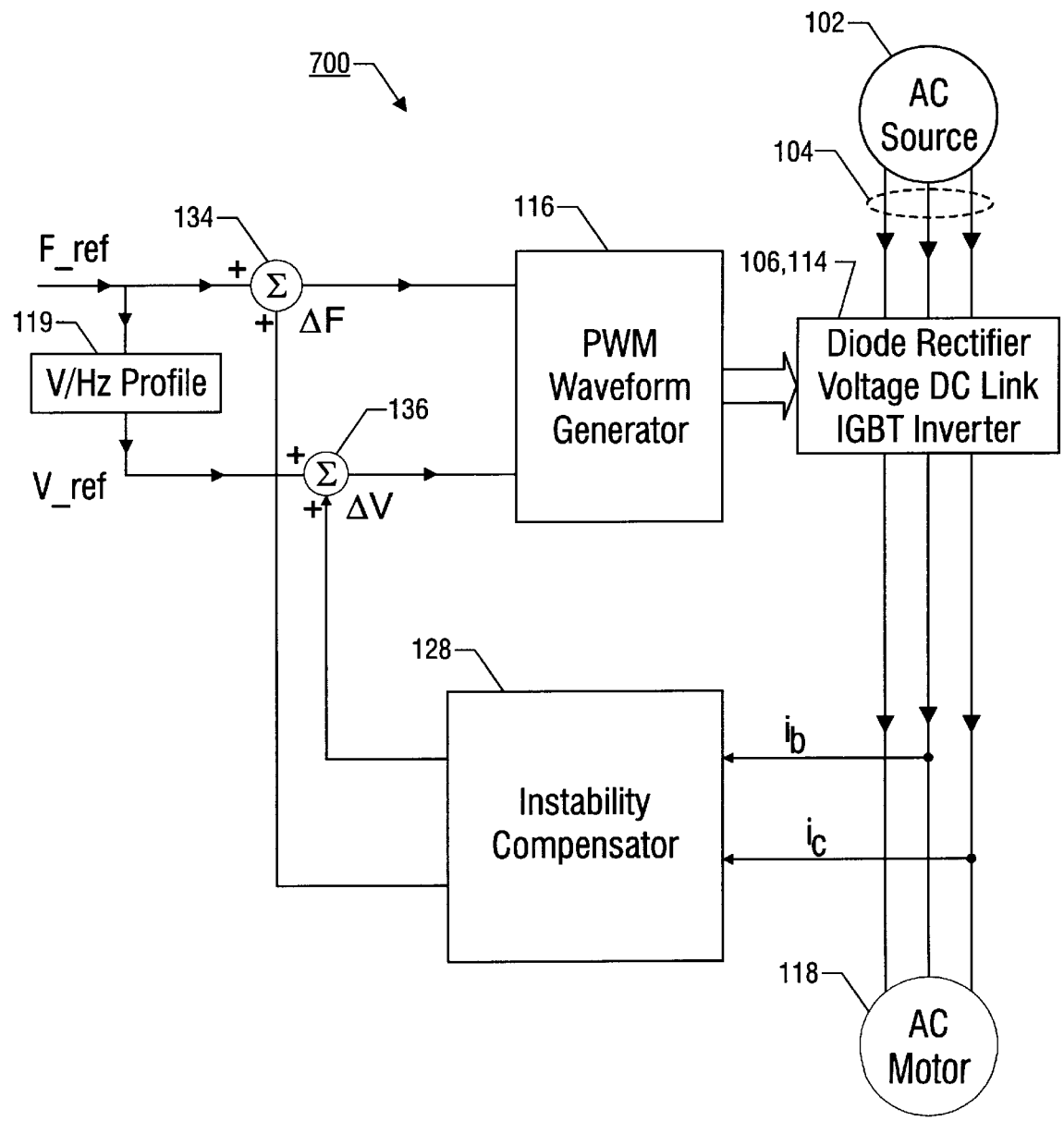
FIG. 7 is an block diagram of a PWM induction motor system incorporating the instability compensation controller from FIG. 6.

FIG. 7 is an diagrammatic representation of system 700 in accordance with the presently disclosed embodiment of the invention. To emphasize the fact that the present invention may be advantageously employed in connection with existing PWM drive systems, such as system 100 from FIG. 1, elements of system 700 in FIG. 7 which are essentially identical to those in system 100 in FIG. 1 have retained identical reference numerals in FIG. 7, As shown in FIG. 7, the system 700 receives the frequency reference signal F_ref which specifies the desired frequency of the PWM waveform to be generated. F_ref is applied to V/Hz controller 116, as well as to V/Hz profiler 119 for derivation of the voltage reference signal V_ref, in accordance with conventional practice in the art and as discussed above with reference to FIG. 1. Instability compensator 128 samples two phases of the motor current, designated $i_b$ and $i_c$ in FIG. 7, to produce the $\Delta F$ and $\Delta V$ compensation signals discussed above. These compensation signals are summed with the F_ref and V_ref signals respectively, as represented by summation elements 134 and 136 in FIG. 7, to achieve the instability compensation.

Figure 8:
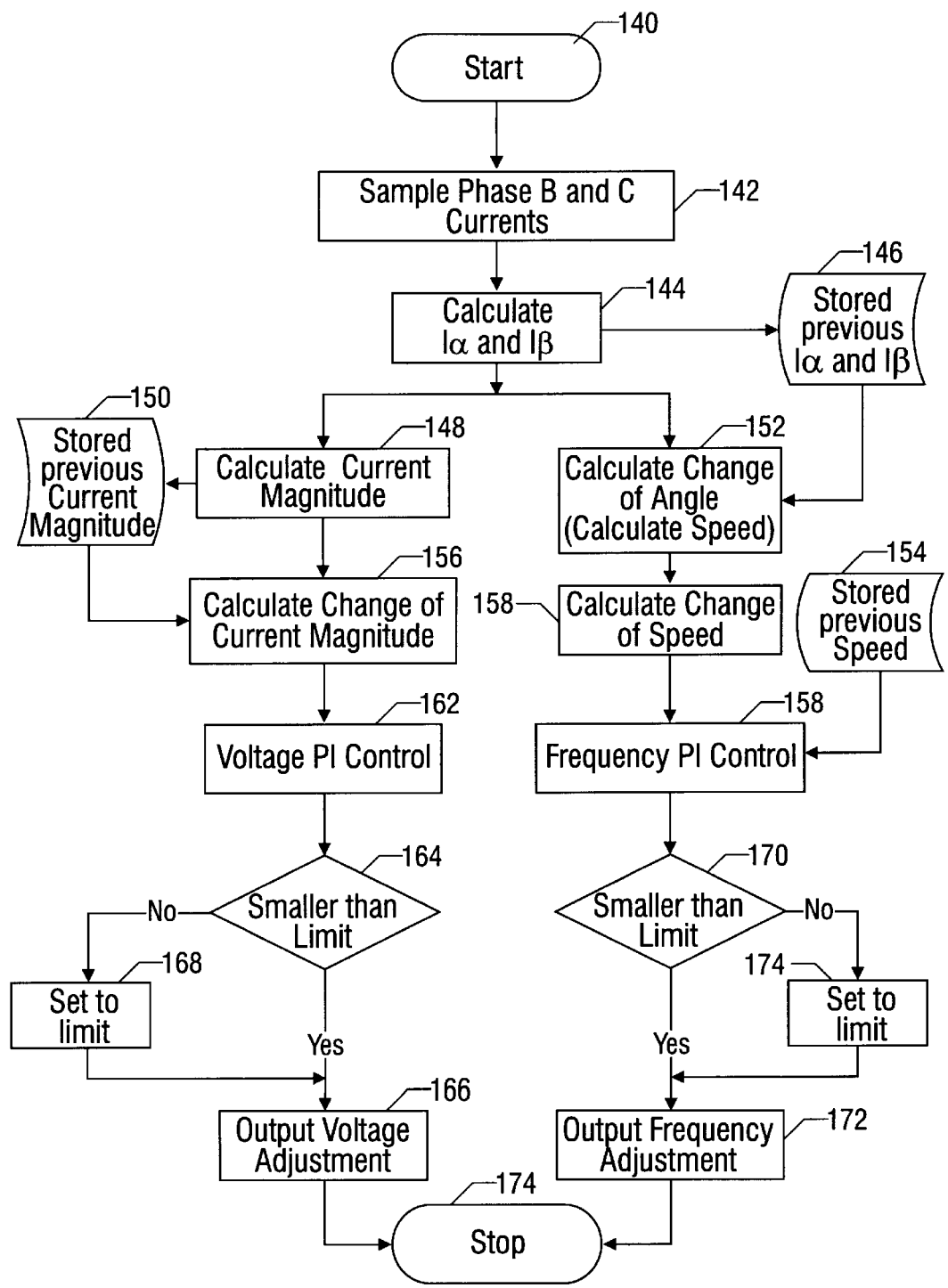
FIG. 8 is a flow diagram illustrating the instability compensation methodology employed in the system of FIG. 7.

FIG. 8 is a flow chart illustrating the process of instability compensation in accordance with the presently disclosed embodiment of the invention. From the starting point 140, the first step in the compensation process is to sample two phases of the motor current, $i_b$ and $i_c$, as discussed above. This sampling is represented by block 142 in FIG. 8. As will be appreciated by those of ordinary skill in the art, the sampling of the motor current is performed repeatedly during operation of motor system 100. In the disclosed embodiment, for example, the motor currents are sampled at a sampling rate of 1 kHz. For notational purposes, a given kth current sample pair $\{i_b, i_c\}$ will be designated herein as $\{i_b(k)$ and $i_c(k)\}$ while the immediately preceeding current sample will be designated $\{i_b(k-1), i_c(k-1)\}$.

Next, $i_\alpha$ and $i_\beta$ are calculated, in accordance with the Equations 3 and 4 above, as represented by block 144 in FIG. 8.

Each time $i_\alpha$ and $i_\beta$ are calculated, these values are stored for later use, as represented by block 146. That is, each time a pair $\{i_\alpha(k-1), i_\beta(k-1)\}$ is calculated, it is stored for later derivation, in connection with a subsequent pair $\{i_\alpha(k), i_\beta(k)\}$, of a "delta" or difference value, as will be hereinafter described. Next, the current magnitude $$|\bar{i}_S|$$

is calculated, according to Equation 2 above, as represented by block 148. Each time $$|\bar{i}_S|$$

is calculated, this value is stored, as represented by block 150. That is, again, each time a value $$|\bar{i}_S(k-1)|$$

is computed, it is stored for use, in connection with a subsequent value $$|\bar{i}_S(k)|,$$

to derive a difference value $$\Delta|\bar{i}_S|.$$

Also, as represented by block 152, the change of current angle $\Delta\theta$ is calculated according to Equation 8 above. Each time $\Delta\theta$ is calculated, this value is stored for later use, as represented by block 154. That is, each time a value $\Delta\theta(k-1)$ is computed, it is stored for use with a subsequently computed value $\Delta\theta(k)$ in computing the "delta" or difference value $\Delta\omega$, according to Equation 8 above, as represented by block 158 in FIG. 8.

In block 156, the change in current magnitude, $$\Delta|\bar{i}_S|$$

is computed, using the value $$|\bar{i}_S(k)|$$

calculated in block 148 and the previous value $$|\bar{i}_S(k-1)|$$

stored in block 150. Likewise, the change in current speed, $\Delta\omega$, is computed using the value $\Delta\theta(k)$ computed in block 152 and the previous value $\Delta\theta(k-1)$ stored at block 154, according to Equation 7.

Having computed $$\Delta|\bar{i}_S|$$

and $\Delta\omega$, the compensation values $$\Delta|\bar{v}_S|,$$

and $\Delta F$ can now be derived, as represented by blocks 160 and 162, respectively.

In decision block 164, a determination is made whether the $$\Delta|\bar{v}_S|,$$

voltage compensation value is larger than a predetermined upper limit. If not, the computed $$\Delta|\bar{v}_S|,$$

is used as the voltage instability compensation parameter to be summed with the voltage reference value V_ref (see FIG. 7), as represented by voltage adjustment block 166 in FIG. 8. If the computed $$\Delta|\bar{v}_S|$$

does exceed the predetermined limit, it is adjusted down to the limit, in block 168, and this adjusted value is used in adjustment block 166.

Similarly, in decision block 170, a determination is made whether frequency compensation parameter $\Delta F$ exceeds a predetermined limit. If not, the computed value is used in frequency adjustment block 172. Otherwise, the $\Delta F$ parameter is adjusted down to the limit, in block 174, before compensation adjustment in block 172. This concludes the compensation process (block 174).

As noted above, the present invention may be readily implemented and embodied in a software-based PWM motor controller, as would be apparent to anyone of ordinary skill in the art. Computer-based motor controllers, which operate under control of a PWM motor controller software, are well known in the art. The following assembly-language code implements the instability compensation process in accordance with the presently disclosed embodiment of the invention, as described above with reference to FIG. 8:

```
/* ===============function ============= */
void   instability_identification (void)
/* ============================ */
{
    asm
    {
        ld      TR01, i_ds;
        shra    TR01, #5;
        ld      TR45, Ialpha;
        add     TR01, TR45;
        shra    TR45, #2;
        sub     TR01, TR45;   /* TR01 = scaled Ialpha_present */
        ld      TR23, i_qs;
        shra    TR23, #5;
        ld      TR45, Ibeta;
        add     TR23, TR45;
```

```
        shra    TR45, #2;
        sub     TR23, TR45;    /* TR23 = scaled Ibeta_present */
    }
/***********************************************************
*              Calculation of Change of Angle              *
***********************************************************/
    /* DAngle =
     * Ialpha_previous * Ibeta_present - Ialpha_present *
Ibeta_previous
     */
    asm mul     TR4567,    TR23, Ialpha;
    asm st      TR01,      Ialpha; /* update Ialpha */
    asm ld      TR01,      Ibeta;
    asm st      TR23,      Ibeta;          /* update Ibeta */
    asm mul     TR0123,    TR01, Ialpha;
    asm sub     TR45,      TR01;
    asm subc    TR67,      TR23;           /* TR4567 = present DAngle */
    asm ld      TR01,      DAngle_0;  /* retrieve previous filtered
DAngle */
    asm ld      TR23,      DAngle_1;
    asm st      TR45,      DAngle_0;   /* update filtered DAngle   */
    asm st      TR67,      DAngle_1;
    asm sub     TR45,      TR01;           /* TR4567 =
*/
    asm subc    TR67,      TR23;           /* present DAngle - previous
DAngle */
    /* Filter DAngle difference */
    asm ld      TR01,      DAngle_diff_0;
    asm ld      TR23,      Dangle_diff_1;
    asm shral   TR0123,    #2;
    asm shral   TR4567,    #2;
    asm sub     TR45,      TR01;
    asm subc    TR67,      TR23;
    asm add     TR45,      DAngle_diff_0;   /* TR4567 =
*/
    asm addc    TR67,      DAngle_diff_1;   /* DAngle difference
filtered */
    asm st      TR45,      DAngle_diff_0;   /*update filtered
difference */
    asm st      TR67,      DAngle_diff_1;
    asm SHLL    TR4567, #10;                /* TR67 = DAngle
Difference */
    DAngle_diff = TR67;
} /** instability_identification( ) **/
/*===================== =function ===========
void instability_compensation (void)
/*==================================
{
    if ( fx100_diff != 0 )    /* Transient state, no stability
comp */
    {
        PIF_int_0 >>= 2;
        TR01 = fx100_adj_0;
        asm SHRA TR01, #1;
        fx100_adj = TR01;
        fx100_adj_0 = TR01;
    }
    else /* Steady state */
    {
        if ( final_dir == FORWARD )
        {
            TR23 = DAngle_diff;
        }
        else if ( final_dir == REVERSE )
        {
            TR23 = -DAngle_diff;
        }
        else
            TR23 = 0;
        fx100_adj = TR23;    /* Proportional control */
        asm shra TR23, #1;
    }
    asm { SHRA TR23, #1;}    /* Integral control */
    PIF_int_0 += TR23;
    fx100_adj += PIF_int_0;
    TR01 = freq_limit;
    if ( fx100_adj > TR01 )
    {
        PIF_int_0 = TR01;
        fx100_adj = TR01;
```

```
    }
    else if ( fx100_adj < -(int)TR01 )
    {
        PIF_int_0 = -(int)TR01;
        fx100_adj = -(int)TR01;
    }
    fx100_adj_0 = fx100_adj;
    TR01 = fx100_adj;
}
} /* instability_compensation( ) */
```

Figure 9A:
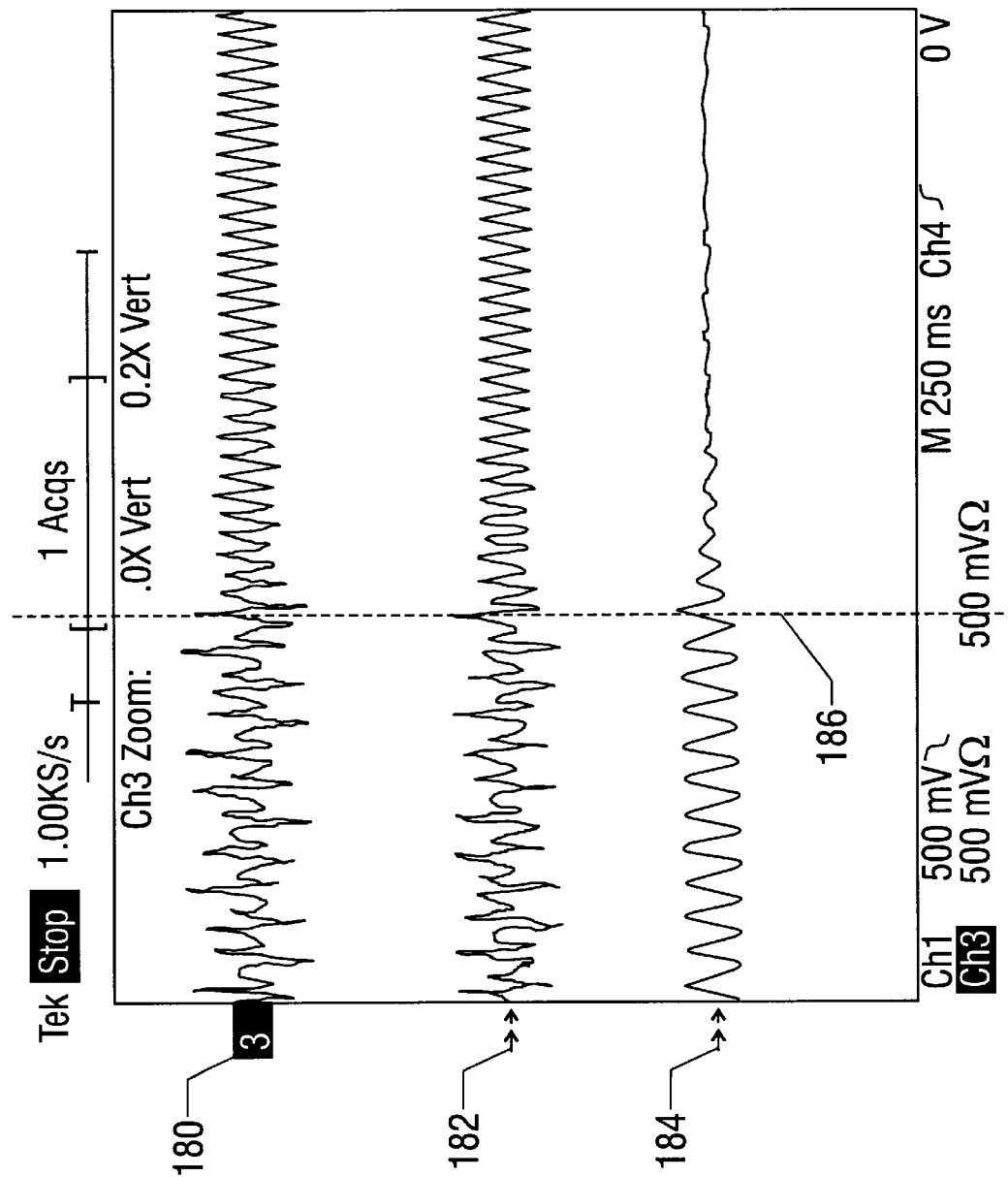
FIGS. 9a and 9b are graphs showing the effects of the instability compensation controller on the phase currents and rotor speed oscillation in the system of FIG. 7.
Figure 9B:
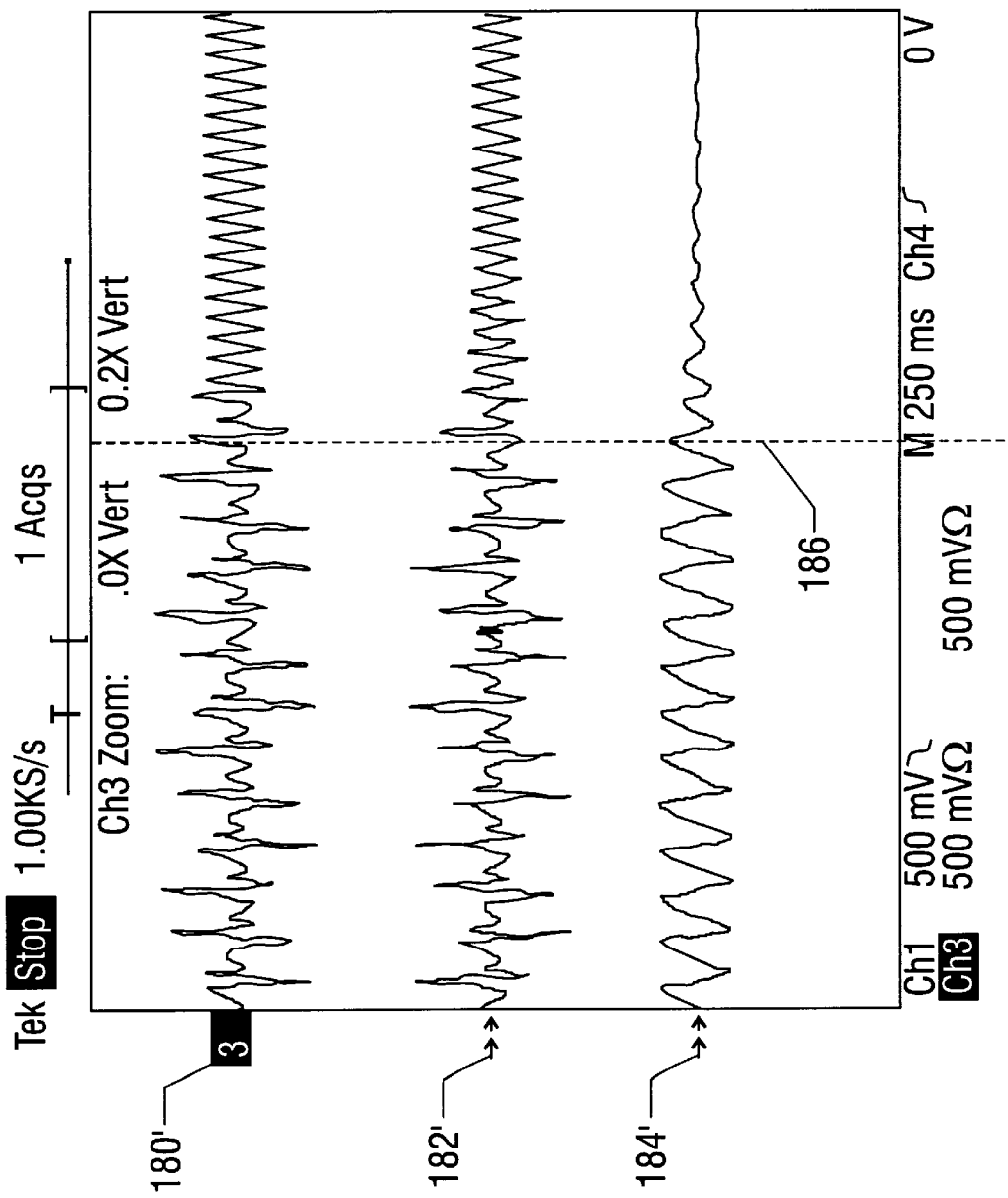

FIGS. 9a and 9b illustrate the beneficial effects of the instability compensation system in accordance with the presently disclosed embodiment of the invention. FIG. 9a shows two phase currents $i_b$ and $i_c$, their waveforms being designated with reference numerals 180 and 182 in FIG. 9a, and a waveform 184 representing the rotor speed oscillation. When instability compensation system 100 is activated, at a time represented by dashed line 186 in FIG. 9a, the phase currents become almost sinusoidal and significantly less distorted. The speed oscillation essentially disappears. The transition following activation of system 100 takes approximately 500 mSec.

The experimental results represented in FIG. 9a reflect a system having a 10 HP drive, a 20 Hz output, and 2.5 kHz PWM frequency. FIG. 9b, on the other hand, presents corresponding experimental results from the same system, except with a 8.0 kHz PWM frequency. The effects of compensation system 100 on dynamic performance (e.g., acceleration and deceleration) have also be experimentally verified.

From the foregoing detailed description of a specific embodiment of the invention, it should be apparent that a method and apparatus for instability compensation in PWM induction motor systems has been disclosed. Although a specific embodiment of the invention has been described herein in some detail, it is to be understood that this has been done merely to illustrate various features and aspects of the invention, and is not intended to be limiting with respect to the scope of the invention. It is believed that various substitutions, alterations, and/or modifications, including but not limited to those design alternatives that may have been specifically mentioned herein, may be made to the disclosed embodiment of the invention without departing from the spirit and scope of the invention as defined in the claims, which follow.

What is claimed is:

1. A method of identifying instability in a three-phase induction motor drive system, comprising:

(a) detecting, in an instability detector circuit coupled to at least two of three phases of said motor drive system, a change $$\Delta |\bar{i_S}|$$

in the magnitude of stator current in the system; and (b) detecting, in an instability detector circuit coupled to at least two of three phases of said motor drive system, a change $\Delta\omega$ in angular speed change in the system; and (c) identifying instability in said motor drive system based upon values of $\Delta|\overline{i_S}|$ and $\Delta\omega$.

2. A method in accordance with claim 1, wherein said step (a) of detecting a change $\Delta|\overline{i_S}|$ in the magnitude of stator current in the system comprises:
- (c) sampling current in at least two phases of said system to obtain first current values $i_b(k-1)$ and $i_c(k-1)$;
- (d) susbsequently sampling in said at least two phases of said system to obtain second current values $i_b(k)$ and $i_c(k)$;
- (e) computing $\Delta|\overline{i_S}|$ according to the formula $$\Delta|\overline{i_S}| = ||\overline{i_S}(k)| - |\overline{i_S}(k-1)||$$

where $$|\overline{i_S}(k)| = \sqrt{i_\alpha^2(k) + i_\beta^2(k)}, \text{ and}$$

$$|\overline{i_S}(k-1)| = \sqrt{i_\alpha^2(k-1) + i_\beta^2(k-1)}$$

and where, for x=k and k−1, $$i_\alpha(x) = -i_b(x) - i_c(x)$$

and $$i_\beta(x) = (i_b(x) - i_c(x))/\sqrt{3}.$$

3. A method in accordance with claim 2, wherein said step (b) of detecting a change $\Delta\omega$ in angular speed change in the system comprises:
- (f) computing a value $\Delta\omega$ according to the formula:

$$\Delta\omega = \Delta\theta(k) - \Delta\theta(k-1)$$

where $$\Delta\theta(k) = \frac{i_\alpha(k)i(k-1) - i_\alpha(k-1)i_\beta(k)}{2|\overline{i_S}(k)||\overline{i_S}(k-1)|}.$$

4. A method of controlling a three-phase induction motor drive system, comprising:
- (a) detecting a change $\Delta|\overline{i_S}|$ in the magnitude of stator current in the system;
- (b) detecting a change $\Delta\omega$ in angular speed change in the system;
- (c) computing a change $\Delta\overline{v_s}$ in a voltage vector $\overline{v_s}$ derived from said change $\Delta|\overline{i_S}|$ in the magnitude of stator current and said change $\Delta\omega$ in angular speed change in said system; and
- (d) adjusting said system's output based on said change $\Delta\overline{v_s}$ in said voltage vector $\overline{v_s}$.

5. A method in accordance with claim 4, wherein step (a) of detecting a change $\Delta|\overline{i_S}|$ in the magnitude of stator current in the system comprises:
- (c) sampling current in at least two phases of said system to obtain first current values $i_b(k-1)$ and $i_c(k-1)$;
- (d) susbsequently sampling in said at least two phases of said system to obtain second current values $i_b(k)$ and $i_c(k)$;
- (e) computing $\Delta|\overline{i_S}|$ according to the formula $$\Delta|\overline{i_S}| = ||\overline{i_S}(k)| - |\overline{i_S}(k-1)||$$

where $$|\overline{i_S}(k)| = \sqrt{i_\alpha^2(k) + i_\beta^2(k)}, \text{ and}$$

$$|\overline{i_S}(k-1)| = \sqrt{i_\alpha^2(k-1) + i_\beta^2(k-1)}$$

and where, for x=k and k−1, $$i_\alpha(x) = -i_b(x) - i_c(x)$$

and $$i_\beta(x) = (i_b(x) - i_c(x))/\sqrt{3}.$$

6. A method in accordance with claim 5, wherein said step (b) of detecting a change $\Delta\omega$ in angular speed in the system comprises:
- (f) computing a value $\Delta\omega$ according to the formula:

$$\Delta\omega = \Delta\theta(k) - \Delta\theta(k-1)$$

where $$\Delta\theta(k) = \frac{i_\alpha(k)i(k-1) - i_\alpha(k-1)i_\beta(k)}{2|\overline{i_S}(k)||\overline{i_S}(k-1)|}.$$

7. A method in accordance with claim 6, wherein said step (c) of computing a change $\Delta\overline{v_s}$ in said voltage vector $\overline{v_s}$ comprises:

(g) computing said change $$\Delta \overline{v_S} = \Delta(|\overline{v_S}|, L\overline{v_S})$$

according to the formulas:

$$\Delta|\overline{v_S}| = K_{pv} * \Delta|\overline{i_S}| + K_{iv} * \int \Delta|\overline{i_S}|dt$$

and $$\Delta(L\overline{v_S}) = K_{pf} * \Delta\omega + K_{if} * \int \Delta\omega dt$$

where $K_{pv}$, $K_{iv}$, $K_{pf}$, and $K_{if}$ are predetermined proportional integration constants.

8. A method in accordance with claim 7, further comprising:

(h) adjusting a voltage parameter of said system in accordance with the magnitude $$\Delta|\overline{v_S}|$$

of said change in said voltage vector $\overline{v}_s$.

9. A method in accordance with claim 8, further comprising:

(i) adjusting a frequency parameter of said system in accordance with a frequency compensation value $\Delta F$ computed according to the formula:

$$\Delta F = \frac{\Delta(L\overline{v_S})}{\text{sampling period}}$$

where sampling period is a constant value corresponding to the time interval between said steps (c) and (d) of sampling at least two phases of current.

10. An apparatus for identifying instability in a three-phase induction motor drive system, comprising:

instability detector circuitry coupled to at least two of said three phases of said motor drive, for detecting a change $$\Delta|\overline{i_S}|$$

in the magnitude of stator current in the system and for detecting a change $\Delta\omega$ in angular speed change in the system; and compensator circuitry coupled to said instability detection circuitry for identifying instability based on values of $$\Delta|\overline{i_S}|$$

and $\Delta\omega$.

11. An apparatus in accordance with claim 10, wherein said instability detector circuitry samples said at least two phases of said system to obtain first current values $i_b(k-1)$ and $i_c(k-1)$ and subsequent second current values $i_b(k)$ and $i_c(k)$;

processing circuitry for computing $$\Delta|\overline{i_S}|$$

according to the formula $$\Delta|\overline{i_S}| = |\overline{i_S}(k)| - |\overline{i_S}(k-1)|$$

where $$|\overline{i_S}(k)| = \sqrt{i_\alpha^2(k) + i_\beta^2(k)}, \text{ and}$$

$$|\overline{i_S}(k-1)| = \sqrt{i_\alpha^2(k-1) + i_\beta^2(k-1)}$$

and where, for x=k and k-1, $$i_\alpha(x) = -i_b(x) - i_c(x)$$

and $$i_\beta(x) = (i_b(x) - i_c(x))/\sqrt{3}.$$

12. An apparatus in accordance with claim 11, wherein said instability detector circuitry comprises:

circuitry for computing a value $\Delta\omega$ according to the formula:

$$\Delta\omega = \Delta\theta(k) - \Delta\theta(k-1)$$

where $$\Delta\theta(k) = \frac{i_\alpha(k)i(k-1) - i_\alpha(k-1)i_\beta(k)}{2|\overline{i_S}(k)||\overline{i_S}(k-1)|}.$$

13. An apparatus for controlling a three-phase induction motor drive system, comprising:

instability detector circuitry, coupled to at least two of said three phases of said motor drive, for detecting a change $$\Delta|\overline{i_S}|$$

in the magnitude of stator current in the system and for detecting a change $\Delta\omega$ in angular speed change in the system;

processing circuitry for computing a change $\Delta\overline{v}_s$ in a voltage vector $\overline{v}_s$ derived from said change $$\Delta|\overline{i_S}|$$

in the magnitude of stator current and said change $\Delta\omega$ in angular speed change in said system; and control circuitry, responsive to said change $\overline{v}_s$ in said voltage vector $\overline{v}_s$ to adjust said system's output.

14. An apparatus in accordance with claim 13, wherein said instability detector circuitry comprises:

a sampling circuit for sampling current in at least two phases of said system to obtain first current values $i_b(k-1)$ and $i_c(k-1)$ and subsequent second current values $i_b(k)$ and $i_c(k)$; and processing circuitry for computing $$\Delta|\overline{i_S}|$$

according to the formula $$\Delta|\overline{i_S}| = |\overline{i_S}(k)| - |\overline{i_S}(k-1)|$$

where $$|\overline{i_S}(k)| = \sqrt{i_\alpha^2(k) + i_\beta^2(k)}, \text{ and}$$

$$|\overline{i_S}(k-1)| = \sqrt{i_\alpha^2(k-1) + i_\beta^2(k-1)}$$

and where, for x=k and k−1, $$i_\alpha(x) = -i_b(x) - i_c(x)$$

and $$i_\beta(x) = (i_b(x) - i_c(x))/\sqrt{3}.$$

15. An apparatus in accordance with claim 14, wherein said instability detector circuitry comprises:

circuitry for computing a value $\Delta\omega$ according to the formula:

$$\Delta\omega = \Delta\theta(k) - \Delta\theta(k-1)$$

where $$\Delta\theta(k) = \frac{i_\alpha(k)i(k-1) - i_\alpha(k-1)i_\beta(k)}{2|\overline{i_S}(k)||\overline{i_S}(k-1)|}.$$

16. An apparatus in accordance with claim 15, wherein said processing circuitry for computing a change $\Delta\overline{v_s}$ in said voltage vector $\overline{v_s}$ comprises:

circuitry for computing said change $$\Delta\overline{v_S} = \Delta(|\overline{v_S}|, \angle\overline{v_S})$$

according to the formulas:

$$\Delta|\overline{v_S}| = K_{pv} * \Delta|\overline{i_S}| + K_{iv} * \int \Delta|\overline{i_S}|dt$$

and $$\Delta(\angle\overline{v_S}) = K_{pf} * \Delta\omega + K_{if} * \int \Delta\omega dt$$

where $K_{pv}$, $K_{iv}$, $K_{pf}$, and $K_{if}$ are predetermined proportional integration constants.

17. An apparatus in accordance with claim 16, further comprising: voltage control circuitry responsive the magnitude $$\Delta|\overline{v_S}|$$

of said change in said voltage vector $\overline{v}_s$ to adjust a voltage parameter of said system.

18. An apparatus in accordance with claim 17, further comprising:

frequency control circuitry responsive to a frequency compensation value $\Delta F$ to adjust a frequency parameter of said system, wherein said frequency compensation value $\Delta F$ is computed according to the formula:

$$\Delta F = \frac{\Delta(\angle\overline{v_S})}{\text{sampling period}}$$

where sampling period is a constant value corresponding to the time interval between said steps (c) and (d) of sampling at least two phases of current.

* * * * *

UNITED STATES PATENT AND TRADEMARK OFFICE
CERTIFICATE OF CORRECTION

PATENT NO. : 5,959,431

DATED : September 28, 1999

INVENTOR(S) : Youqing Xiang

It is certified that error appears in the above-identified patent and that said Letters Patent is hereby corrected as shown below:

In column 16, line 60, (of claim 13) it should read:

control circuitry, responsive to said change $\Delta \overline{v_s}$ in said

Signed and Sealed this

First Day of February, 2000

*Attest:*

Q. TODD DICKINSON

*Attesting Officer*     *Acting Commissioner of Patents and Trademarks*